Patented Mar. 16, 1948

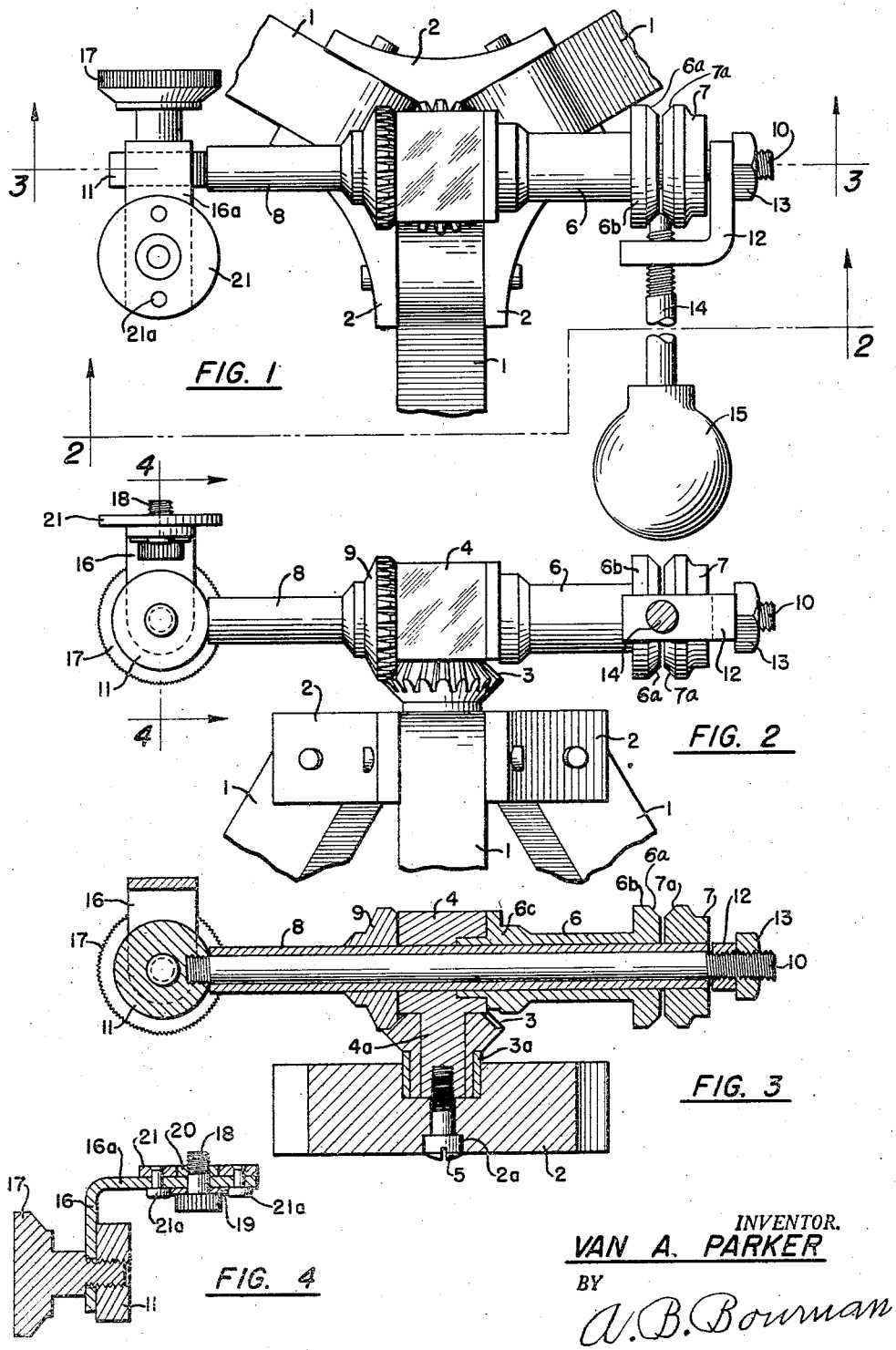

2,437,787

UNITED STATES PATENT OFFICE 2,437,787

PANORAMIC CAMERA TRIPOD CONTROL

Van A. Parker, San Diego, Calif.

Application February 17, 1945, Serial No. 578,499

5 Claims. (Cl. 248—183)

1

My invention relates to a panoramic camera tripod control and the objects of my invention are:

First, to provide a camera tripod control which can be operated with one hand, there being a single lever and knob control by which the camera can be swung through any desired arc on a horizontal plane, through any desired angle on a vertical plane or locked at any desired position by simply turning the knob;

Second, to provide a camera tripod control particularly adaptable for use in photographing subjects of a panoramic nature;

Third, to provide a camera tripod control which has a camera mount providing for a second vertical adjustment by means of which the camera can be set to retain a fixed vertical angle while being rotated horizontally; and Fourth, to provide a camera control which provides steady support for a camera and which is sturdy and dependable in service and practicable to manufacture;

With these and other objects in view as will appear hereinafter, my invention consists of certain novel features of construction, combination and arrangement of parts and portions as will be hereinafter described in detail and particularly set forth in the appended claims, reference being had to the accompanying drawings, and to the characters of reference thereon which form a part of this disclosure in which:

Figure 1 is a fragmentary plan view of the camera control and the head of a tripod, the manual control lever being broken and foreshortened to conserve space; Fig. 2 is a vertical elevational view of the structure shown in Fig. 1 viewed from the line 2—2 in Fig. 1; Fig. 3 is a vertical sectional view taken from the line 3—3 in Fig. 1, the upper portions of the legs shown in Fig. 1 being removed and the camera mount being turned as in Fig. 2 to facilitate the illustration; Fig. 4 is a vertical sectional view taken from the line 4—4 in Fig. 2, of the camera mount and adjacent structure only.

Similar characters of reference refer to similar or identical parts and portions throughout the several views:

The control described herein is primarily for use with cameras especially those cameras used in panoramic photography and the control is shown as combined with a tripod of conventional design, the leg portions 1 of which are pivotally secured to the head 2 which is essentially a flat topped member supported by the tripod legs and

2 supporting the novel structure which is the subject matter of this application.

The bevel gear 3 is rigidly mounted in a recess drilled in the top of the head 2 using an adapter collar 3a, if required, and the center post 4 is rotatably mounted within this gear 3. This center post may be cubical in shape with a cylindrical stem 4a depending through the bevel gear 3 and frictionally contracting the head 2 at the lower end of the stem. The post 4 is retained in this position by the stud 5 which is entered through the head, suitably drilled and countersunk to receive it, and tightly screwed into a threaded hole in the lower end of the stem 4a. The lower face of the center post 4 may also frictionally contact the upper end face of the bevel gear 3. The sleeve 6 is press fitted at one end 6c into a suitable recess in one side of the center post 4 and at the other end is formed with an integral beveled flange 6b, the beveled face being adjacent to the similarly beveled face 7a of the bevel nut 7 which may be press fitted onto or otherwise rigidly affixed to one end of the torque tube 8 which is of proper diameter to turn freely within the said sleeve 6 and a registering hole drilled through the center post 4 and this torque tube 8 may extend beyond the center post 4 a short distance. The bevel gear 9 is mounted on the torque tube 8 on the side of the center post 4 opposite to the sleeve 6 and is fixed thereto to turn with the bevel nut 7 and the teeth of the bevel gear 3. The rod 10 of a length slightly greater than the length of the torque tube 8 and of a diameter to fit easily within said torque tube 8 is threaded at both ends. The camera mount block 11 is tightly threaded onto one end of this rod 10 and the locking lever bracket 12 and lock nut 13 are secured on the other end of this rod and the locking lever 14 terminating in the knob 15 is threaded into the extended portion of the bracket 12, as illustrated in Fig. 1. The inner end of the locking lever 14 is beveled to roughly correspond with the bevel angle of the surfaces 6a and 7a and it will be evident that twisting the knob 15 in one direction will tend to force the bevel nut 7 away from the bevel surface 6a, thus indirectly pulling the bevel gear 9 into tight engagement with the bevel gear 3 and locking the whole vertically rotatable portion of the assembly including the camera mount block 11 against movement relative to the fixed sleeve 6. At the same time and by the same locking action of the locking lever 14 the whole control will be locked against horizontal rotation relative to the fixed bevel gear 3. When the knob 15 is turned in the opposite direction, the camera mount block 11 will be unlocked and free to be turned through any angle in both horizontal and vertical planes.

The actual attachment of the camera may be carried out in several ways and I have represented in the drawings a preferred structure in which the bracket 16 is secured to the camera mount block 11 by means of a thumb screw 17 and the extended arm 16a of the bracket is sufficiently offset from the point of pivotal attachment to allow its being set at any point in a plane normal to the axis of the rod 10. The securement of the camera to the bracket 16 may be accomplished by means of a thumb screw 18, a washer 19 and a threaded washer 20 which acts as a lock washer when the thumb screw is tightened into the camera base and a circular plate 21 riveted as at 21a to the bracket 16, to act as a table for the camera base. This structure allows for the rough setting of the camera before finer adjustment is secured through the employment of the control by manipulation of the locking lever knob.

Though I have shown and described a particular construction, combination and arrangement of parts and portions, I do not wish to be limited to this particular construction, combination and arrangement of parts and portions but desire to include in the scope of my invention the construction, combination and arrangement substantially as set forth in the appended claims.

Having thus described my invention, what I claim as new and desire to secure by Letters Patent is:

1. In a camera control, a support rotatable on a vertical axis, a fixed bevel gear mounted on said axis, a torque tube rotatably mounted in said support and having rigidly mounted thereon a bevel gear engaging the first mentioned bevel gear, a torque rod within said torque tube and supporting a camera mount at one end thereof and supporting at the other end thereof a lever to lock temporarily said torque tube to said torque rod.

2. In a camera control, a support rotatable on a vertical axis, a fixed bevel gear mounted on said axis, a torque tube rotatably mounted in said support and having rigidly mounted thereon a bevel gear engaging the first mentioned bevel gear, a torque rod within said torque tube and supporting a camera mount at one end thereof and supporting at the other end thereof a lever to lock temporarily said torque tube to said torque rod, and to lock said torque tube to a laterally extending member fixed to said support.

3. In a camera control, a support rotatable on a vertical axis, a fixed bevel gear mounted on said axis, a torque tube rotatably mounted in said support and having rigidly mounted thereon a bevel gear engaging the first mentioned bevel gear, a torque rod within said torque tube and supporting a camera mount at one end thereof and supporting at the other end thereof a lever to lock temporarily said torque tube to said torque rod, and to lock said torque tube with a laterally extending sleeve member fixed to said support by simultaneously engaging a beveled member secured to said torque tube and a correspondingly beveled member secured to said lateral member.

4. In a camera control, a support rotatable on a vertical axis, a fixed bevel gear mounted on said axis, a torque tube rotatably mounted in said support and having rigidly mounted thereon a bevel gear engaging the first mentioned bevel gear, a torque rod within said torque tube and supporting a camera mount at one end thereof and supporting at the other end thereof a lever to lock temporarily said torque tube to said torque rod, and to lock said torque tube with a laterally extending sleeve member fixed to said support by simultaneously engaging a beveled member secured to said torque tube and a correspondingly beveled member secured to said lateral member, the lever being threadably secured to a bracket which is rigidly secured to said torque rod.

5. In a control of the character described, in combination, a camera mount, a torque rod secured to said camera mount at one end and to a control lever at the other end, a pivoted support for said rod, a tripod, a beveled gear fixed to said tripod, a matching beveled gear fixed to a torque tube rotatably mounted in said support, a beveled disc fixed to said support, a beveled nut fixed to said torque tube and associated with said beveled disc so that said lever can be jammed therebetween, thus locking the torque rod against movement in any direction.

VAN A. PARKER.

REFERENCES CITED

The following references are of record in the file of this patent:

UNITED STATES PATENTS

| Number | Name | Date |
| --- | --- | --- |
| 1,798,446 | Zerk | Mar. 31, 1931 |